United States Patent

[11] 3,633,010

[72] Inventor Oleg Svetlichny
Chelmsford, Mass.
[21] Appl. No. 34,197
[22] Filed May 4, 1970
[45] Patented Jan. 4, 1972
[73] Assignee Geosystems, Inc.
Burlington, Mass.

[54] COMPUTER-AIDED LASER-BASED MEASUREMENT SYSTEM
9 Claims, 10 Drawing Figs.
[52] U.S. Cl............................................. 235/151.3,
33/46 R, 33/125 A, 148/9.5, 235/151.1, 356/1,
356/4, 356/152
[51] Int. Cl.................................................. G01b 15/04,
G05b 15/02
[50] Field of Search............................................ 235/151.1,
151.3; 148/9.5, 128; 33/125 A, 46 R; 250/59;
356/1, 4, 152

[56] References Cited
UNITED STATES PATENTS
3,187,185 6/1965 Milnes.......................... 356/1 X OTHER REFERENCES
Lamy, R. C. et al. Computer Controlled Grinder Operation in IBM Tech. Disc. Bull. 12(12): May 1970 P. 2,156

Primary Examiner—Malcolm A. Morrison
Assistant Examiner—R. Stephen Dildine, Jr.
Attorney—Morse, Altman & Oates ABSTRACT: A system having laser source and radiation sensor assemblies electrically communicating with a computer is provided for rapid, remote sensing of the static, geometric and dynamic motion properties of a selected specimen. A laser beam incrementally scans the surface of a specimen to be evaluated in response to computer generated programmed signals and the radiation sensor follows the laser beam illumination as at the specimen surface. Both the source and sensor provide output signals representing the angular position of pointing of the source and sensor assemblies. The source and sensor angle signals are triangulated in the computer for calculation of desired geometric and dynamic specimen properties. The computer can be programmed to generate a display for presentation of the specimen properties or for governing industrial control, inspection or processing systems, that are related to the specimen properties measured.

PATENTED JAN 4 1972  3,633,010.

INVENTOR
OLEG SVETLICHNY

BY
Morse, Altman & Oates
ATTORNEYS

INVENTOR
OLEG SVETLICHNY

INVENTOR
OLEG SVETLICHNY

BY
Morse, Altman & Oates

ATTORNEYS

COMPUTER-AIDED LASER-BASED MEASUREMENT SYSTEM

BACKGROUND OF THE INVENTION

1. Field of Invention

The present invention relates to sensing systems and, more particularly, to rapid remote sensing of static, geometric and dynamic motion properties.

2. Description of the Prior Art

Sensing instruments of various types have been proposed for determining static, geometric and dynamic properties of a specimen, such as surface contour, resonant frequency, deformation and the like. Difficulties have been encountered in evaluating subjects due to environmental conditions, complex surface contours, hazardous physical state, and the need to evaluate data rapidly and in real-time. A typical example of one such difficulty is evident in the steel industry where the specimen to be evaluated is a steel slab emerging from a continuous casting machine. The geometric and dynamic properties of the cast steel must be ascertained in order to control he casting and working processes. Conventionally, in the continuous casting operation, a molten steel slab having a frozen outer shell is cooled from outside by water sprays as it is guided through a series of supporting rolls. At low casting speeds, the skin is strong and easily withstands the ferrostatic pressure of the molten steel in the molten core However, at higher casting speeds, the skin strength is decreased due to the thinness of and high temperature of the outer shell. In consequence, the frozen skin can not withstand the ferrostatic pressure and the frozen skin bulges as the slab passes between adjacent supporting rolls. If this bulging is excessive, a failure of the frozen skin, commonly called "breakout," may occur with a potentially disastrous result. In order to avoid such breakouts, a conservatively low casting speed is used.

Another typical example of such difficulty, in connection with the continuous casting of steel, is the on-line detection and selective removal of surface defects. Presently, such defects are removed either manually (machining, grinding, chiseling, burning) after the slabs have been cooled to room temperature, or by total flame scarfing in which a layer on each of the four sides of the steel slab surface is removed during casting. Such methods result in a high labor cost, due to the manual handling of steel slab, in the manual scarfing procedure or in a substantial loss of yield in the total flame scarfing technique.

SUMMARY THE INVENTION

An object of the present invention is to provide a rapid remote-sensing measurement system which is characterized by universally mounted laser and radiation sensor assemblies electrically communicating with a computer. The surface of a specimen to be evaluated is scanned incrementally by the beam of energy produced by the laser assembly in response to program signals generated by the computer. The radiation sensor follows the illuminated scanned points on the surface of the specimen. The output signals from the laser and radiation sensor assemblies, representing angular position, are entered into the computer for determination of the surface contour by triangulation. The combination of laser and radiation sensor assemblies and computer is such as to provide a versatile and expedicious rapid, remote-sensing measurement system.

The invention accordingly comprises the system possessing the construction, combination of elements, and arrangement of parts that are exemplified in the following detailed descriptions, the scope of which will be indicated in the appended claims.

BRIEF DESCRIPTION OF DRAWINGS

For a fuller understanding of the nature and objects of the present invention, reference should be had to the following detailed description taken in connection with the accompanying drawings wherein.

DETAILED DESCRIPTION OF THE PREFERRED EMBODIMENT

Figure 1:
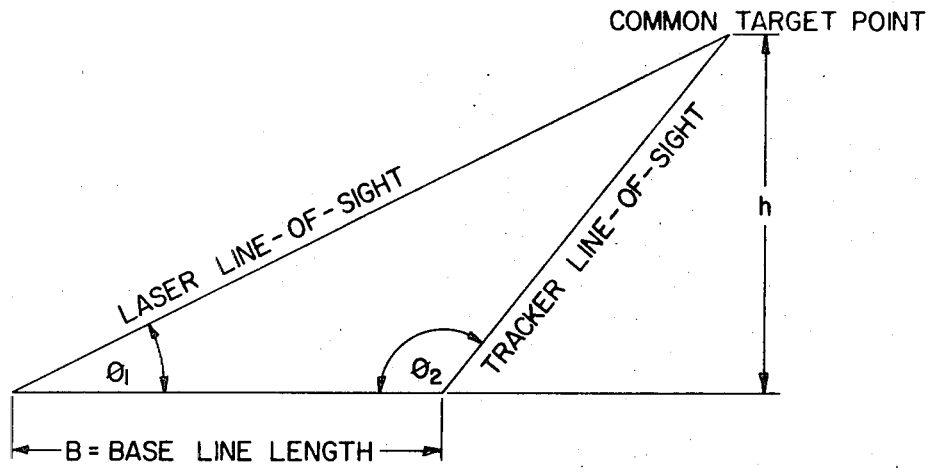
FIG. 1 is a trigonometric diagram illustrating certain principles of the present invention.

The system operates on the triangulation principle depicted in FIG. 1, which is based on the fact that light travels in a straight line. By measuring the angle between two line of sights to a common target point and knowing the length of the base, it is possible to compute the distance to the target point. The system used the high intensity, monochromaticity, and small divergence properties of a laser beam to define the common target point, the laser beam defining a small spot of light on the sample being measured or examined. The high intensity of the laser beam makes the luminance of the spot more intense than the ambient luminance of the sample, even when the sample is a glowing steel slab. Hence, a tracking device mounted on the same base as the laser can easily follow the center of the spot without significant interference from other light. The pointing angles of the laser and the optical axis of the tracker are measured continuously by angular encoders. Since the baseline distance is fixed and known, the location of the illuminated spot is established. The target distance $h$ is computed from the following equation $$h = B \sin\theta_1 \sin\theta_2 / \sin\theta_1 + \theta_2)$$

where:

$B$ is a precisely known baseline length, and $\theta_1, \theta_2$ are accurately measured by electronic devices.

Figure 2:
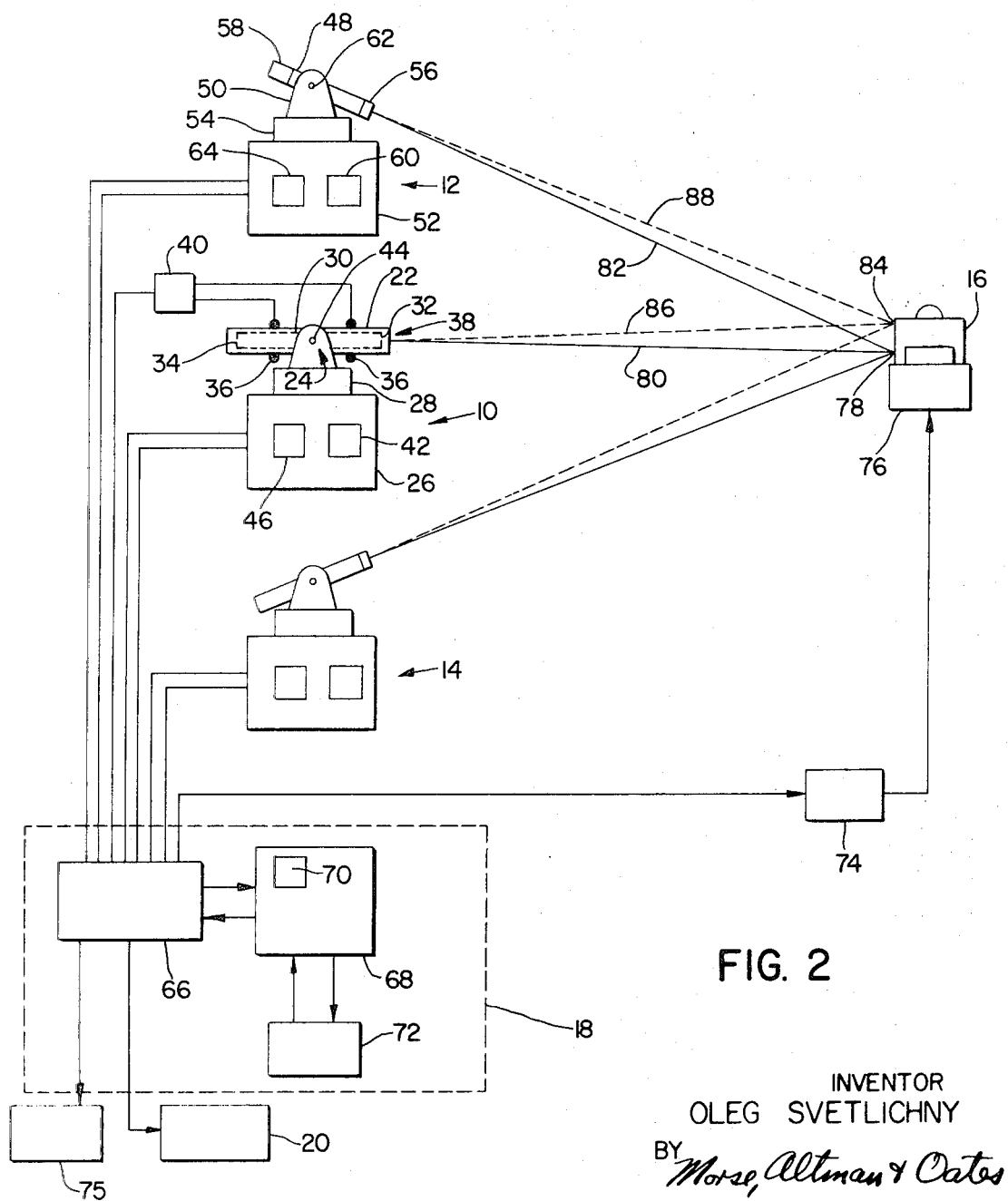
FIG. 2 is a block diagram, somewhat perspective, of a sensing system embodying the present invention.

Generally, the measurement system of FIG. 2 is comprised of an illumination source 10 for generating an imaged beam of energy like radiation sensors 12, 14 for detecting illumination as at the surface of a specimen 16; a computer 18 electrically communicating with source 10 and radiation sensors 12, 14 for determining the properties of specimen 16; and a display 20 electrically connected to computer 18 for presenting the specimen properties.

Illumination source 10 is comprised off a coherent energy generator 22 pivotally mounted to a support 24 which is rotatably mounted to a control 26 via a housing 28. In this embodiment, light generator 22 is a laser of the type having a gas-filled tube 30, Fabry-Perot plates 32, 34 fixed at opposite extermities of tube 30, and a pump 36 coupled to the gas in tube 30. Pumping power is applied to laser 22 from a supply 40 via pump 36 and a coherent energy beam is emitted at 38. Various types of coherent energy sources may be used in alternative embodiments. Control 26 includes a servo 42 for governing the pivoting movement of laser 22 about a shaft 44 and the rotating movement of housing 28, and a servo follower 46 operatively connected to servo 42 for providing output signals representing the angular position of laser 22.

Each of like radiation sensors 12, 14 is comprised of a radiation-detector 48, pivotally mounted to a support 50 which is rotatably mounted to a control 52 via a housing 54, for generating error signals whose magnitude is representative of the radiation sensor assembly angular pointing errors with respect to the illuminated spot on the surface of specimen 16. In order to eliminate undesired luminance from the surface of specimen 16, a filter 56 is placed in front of radiation-detector 48. A signal separator 58 is electrically connected to radiation-detector 48 for isolating the output error signals for each of two angular coordinates. A servo 60, responsive to the signals as at the output of signal separator 58, is connected to support 50 and housing 54 for governing the pivoting movement of radiation-detector 48 about a shaft 62 and the rotating movement of housing 54. The signals as at the output of separator 58 are such that radiation-detector 48 is directed toward the highest intensity of luminance as at the surface of specimen 16. A servo follower 64 is operatively connected to servo 60, the signals as at the output of a servo follower 64 representing the angular position of radiation-detector 48. It is to be understood that the scope of the invention is intended to include radiation-detectors and scanning devices such as an image dissector, a photocell, a thermocouple, an array of silicon detectors, etc.

Computer 18 is comprised of an input-output 66, a central processor 68 including an arithmetic unit 70, electrically communicating with input-output 66, and a memory 72 electrically communicating with central processor 68. Data signals as at the output of central processor 68 are transmitted via input-output 66 for controlling illumination source 10, receiver 12 and 14, and supply 40. Angular position signals as at the output of servo followers 46 and 64 are applied to central processor 68 via input-output 66 for calculation of the properties of specimen 16 being evaluated. Specimen property signals as at the output of central processor 68 are applied to display 20 via input-output 66 for presentation. Control signals, calculated from specimen properties according to programmed instructions, are transmitted via input-output 66 to external controller 75 for governing inspection, testing, manufacturing or other industrial processes in accordance with a latest measurement of specimen 16.

As shown in FIG. 2, specimen 16 may be mounted on a shaker 76 which is adapted for triaxial movement in response to select signals as at the output of driver 74. In one example of system operation, control signals as at the output of input-output 66 are applied to servo 42 and supply 40, in consequence a laser beam is directed toward a selected surface spot 78 of specimen 16. The illuminated spot as at 78 is sensed in detector 48. The signals as at the output of detector 48 are applied to servo 60 via signal separator 58, whereby detector 48 is directed toward the illuminated spot 78 lines 80 and 82 denoting the angular position of laser 22 and detector 48, respectively. The signals as at the output of servo followers 46 and 64, representing angular positions 82 and 80, respectively, are applied to computer 18 via input-output 66. The distance between detector 48 and spot 78, is calculated by triangulation in computer 18, the distance between receiver 12 and illumination source 10 being known. Thereafter, a second control signal is applied to servo 42, in consequence the laser beam is directed toward a selected surface spot 84 of specimen 16. Detector 48 is directed toward the illuminated spot as at 84 in the manner hereinbefore described. The new angular positions of laser 22 and detector 48 are denoted by lines 86 and 88, respectively. The new signals as at the output of servo followers 46 and 64, representing angular positions 88 and 86 respectively, are applied to computer 18 via input-output 66 and a new set of distance calculated. It will be readily appreciated that by incrementally scanning the surface of subject 16 with the laser beam, the contour 6 the surface of specimen 16 can be obtained. Data signals representing the results of the triangulation calculations are applied to display 20 for presentation. It is to be understood that in alternative embodiments the number of radiation sensors is other than two, for example one or three.

In a second example, shaker 76 is vibrated in response to the signals at the output of driver 74 and laser 22 is held stationary. Accordingly, as specimen 16 is vibrated, detector 48 follows the relative movement of the illuminated spot on the surface of specimen 16. The varying angular position of detector 48 is transmitted to computer 18 via servo follower 64 for calculation of the displacement, velocity and/or acceleration of specimen 16.

Figure 3:
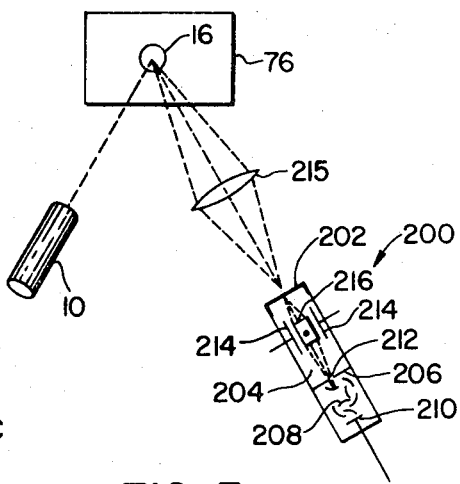
FIG. 3 is a schematic diagram of an alternative embodiment of FIG. 2.

In the alternative embodiment of FIG. 3, the radiation sensor is an image dissector tube 200 which is comprised of a photocathode 202, an electron-optic imaging system 204, an aperture plate 206, a photomultiplier structure 208 and an anode 210. The spot from laser 10 is imaged by a lens 215 onto photocathode 202 and the photocathode electrons are imaged onto plate 206. Since plate 206 has a small opening or hole 212, only those electrons from a very small spot on photocathode 202 enter photomultiplier structure 208. A varying voltage is applied to horizontal and vertical deflection plates 214, 216, respectively, in consequence the small hole is, in effect, moved around the photocathode area. If the hole is moving in a path concentric with the spot, the signal as at anode 218 of tube 200 is at a constant level. If the hole is moving in a path eccentric with the spot, the signal as at the anode of tube 200 is sinusoidal. For small deviations, the magnitude of the signal as at the output of tube 200 is proportional to the distance between the centers of the spot and hole path and the phase of the signal is proportional to the direction of the error signal. Thus, if the DC component of the varying voltages on plates 214, 216 is readjusted in accordance with the signal, so that the signal level is brought close to zero, the light spot is being tracked on the tube. The DC voltages are thus proportional to the light displacement and represent the desired measurement.

Figure 4:
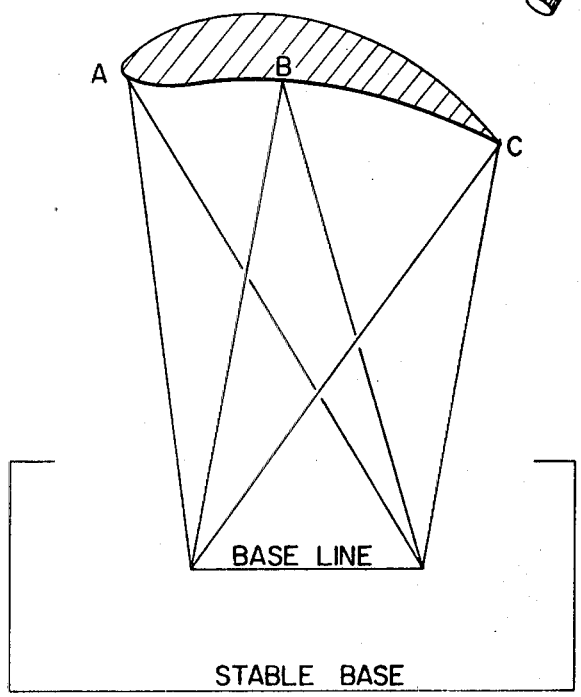
FIG. 4 is a trigonometric diagram illustrating an application of the system to a contouring problem.

FIG. 4 illustrates an application of the system to a contouring problem in which the laser beam is made to scan a fixed surface. As the scanning proceeds from position A to B to C in a continuous manner, the contour of the object is generated by computing distances from the baseline of points A, B, C and all points in between. Again, by feeding the output signals into a computer, online inspection of surfaces becomes possible. For example, closed loop control of continuous casting of steel and online scarfing of continuously cast steel slabs, later described, are based on the real-time contouring application of the system.

Figure 5:
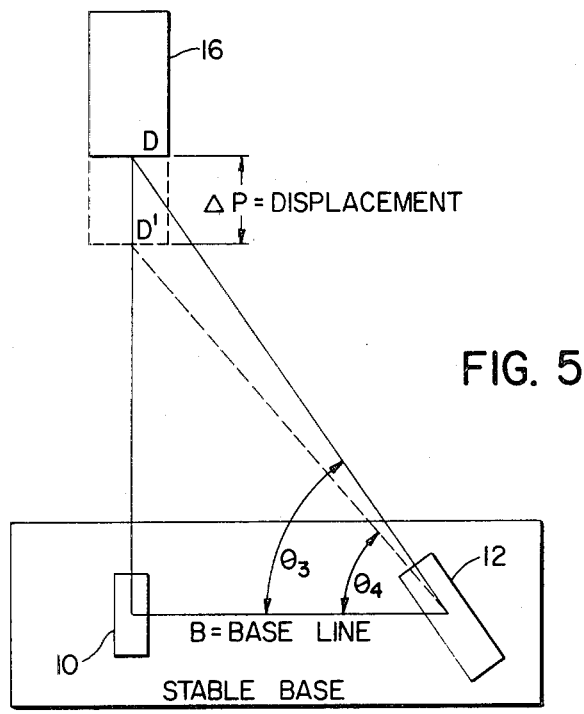
FIG. 5 is a trigonometric diagram illustrating an application of the system to a vibrational testing problem.

FIG. 5 illustrates an application of the system to a vibrational testing problem. As specimen 16 moves (vibrates) from position D to D'; radiation sensor 12 generates signals representing the incremental angle through which its line of sight has moved in following the illuminated spot. The successive measurements provide data to compute displacement, velocity, and acceleration of specimen 16 as follows:

Displacement $= \Delta P = B (\tan \theta_3 - \tan \theta_4)$
Velocity $= d (\Delta P)/dt$
Acceleration $= d^2 (\Delta P)/dt^2$ These computations can be performed in real-time, when desired, by feeding the measurement data to an online computer. In an alternative embodiment of the present invention the number of illumination sources is other than one, for example two. When two or more lasers are employed, the relative motion of two or more spots can be detected, hence deformation under test can be measured. It is possible also to measure deformation using a single beam which alternates between two positions and scans more rapidly than the motion of acceleration.

In an alternative high-speed embodiment of the present invention, radiation sensor units 12 and 14 are replaced by image dissector tubes of the type shown in FIG. 3, the image of the spots 78 and 84 being optically focused onto the sensitive photocathode of the image dissector in the usual manner. In this embodiment, the position of the spot image is detected by the electrical scanning of the image dissector tube in contrast to the mechanical scanning described in connection with FIG. 2. Electrical position signals from the image dissector tubes are applied to the computer 18 via input-output 66 and the distance between the illuminated spot and the detector are calculated by triangulation. In this embodiment, surface contours may be measured by scanning the laser source 22 over the entire specimen surface 16.

In yet another alternative embodiment, the image dissector is replaced with a silicon cell sensitive to image spot displacement in two dimensions. The electrical outputs represent image displacement and are applied to computer 18 via input-output 66.

It will be appreciated from the foregoing that the system provides the following key features:

1 Automated measurements—feature is valuable for applications which require many measurements in a short time and in a repetitive manner. For example, vibrational testing at 60 c.p.s. requires about 600 measurements per second in order to resolve 1 percent of the displacement. Coupling of the output signals to an online computer allows reduction of the measurement data immediately, or the data can be preprocessed (edited, formated, scaled, smoothed, etc.) and recorded for later reduction. In either case, the data acquisition and reduction is automated for efficiency and economy.

2. Remote measurements—because the measurements are made remotely, the applications of the system extend into areas where the environment is hazardous to human beings and ordinary instruments. Typical examples include measuring the level of molten metal, the shape of white hot steel slabs, and measurements in the vacuum of space, in corrosive atmospheres, explosive environments, or at high voltage.

3. Rapid measurements—the ability to track or scan rapidly permits inspection under dynamic rather than static conditions. For example, turbine blades could be examined under conditions of full speed rotation.

4. Precision measurements—the unique properties of the laser beam and the high resolution of angle encoders allows one to make measurements of high accuracy. For example, deformations as small as one wavelength can be detected.

5. Real-time measurements information—because the measurement data can be fed into an online computer, the information can be used in real-time. For example, in a closed process control loop.

The following example further illustrate the application of the present invention. The performance of the system is determined primarily by the wavelength of light used. Typical data is as follows:

EXAMPLE I

Accelerometer Applications. When the system is used to measure the motion of an object undergoing vibrational testing, the following applies, using a typical laser source for viewing a small optical quality reflecting region at the surface of the vibrating specimen:

| Apparatus Parameters | |
|---|---|
| Wavelength of Source Illumination | 0.6 micron |
| Distance to Object | 10 centimeters |
| Source Optical Aperture | 5 millimeters |
| Shaker Frequency | 30 hertz |
| | |
| Performance | |
| Minimum Resolvable Motion | $2 \times 10^{-8}$ meter |
| Minimum Detectable Acceleration | 0.002 g. |
| Frequency Response | DC to beyond 1 MHz. |
| Maximum Detectable Acceleration | Unlimited |

EXAMPLE II

Surface Contouring and Inspection Applications. When the system is used to determine or inspect the curvature or form or shape of surfaces the following applies:

| Apparatus Parameters | |
|---|---|
| Distance to Surface | 1 meter |
| Source Optical Aperture | 5 millimeters |
| wavelength of Source Illumination | 0.6 micron |
| Mechanical Scan Frequency | 60 Hertz |
| | |
| Performance | |
| Minimum Resolution (wavelength limited) | 0.0002 meter |
| Minimum Resolution (size limited) | Object size $\times 10^{-3}$ meter |
| Inspection Rate (mechanically limited) | 16 seconds per object |
| Inspection Rate (at 1 cm. resolution) | 1.6 second per object |

Figures 6, 6A:
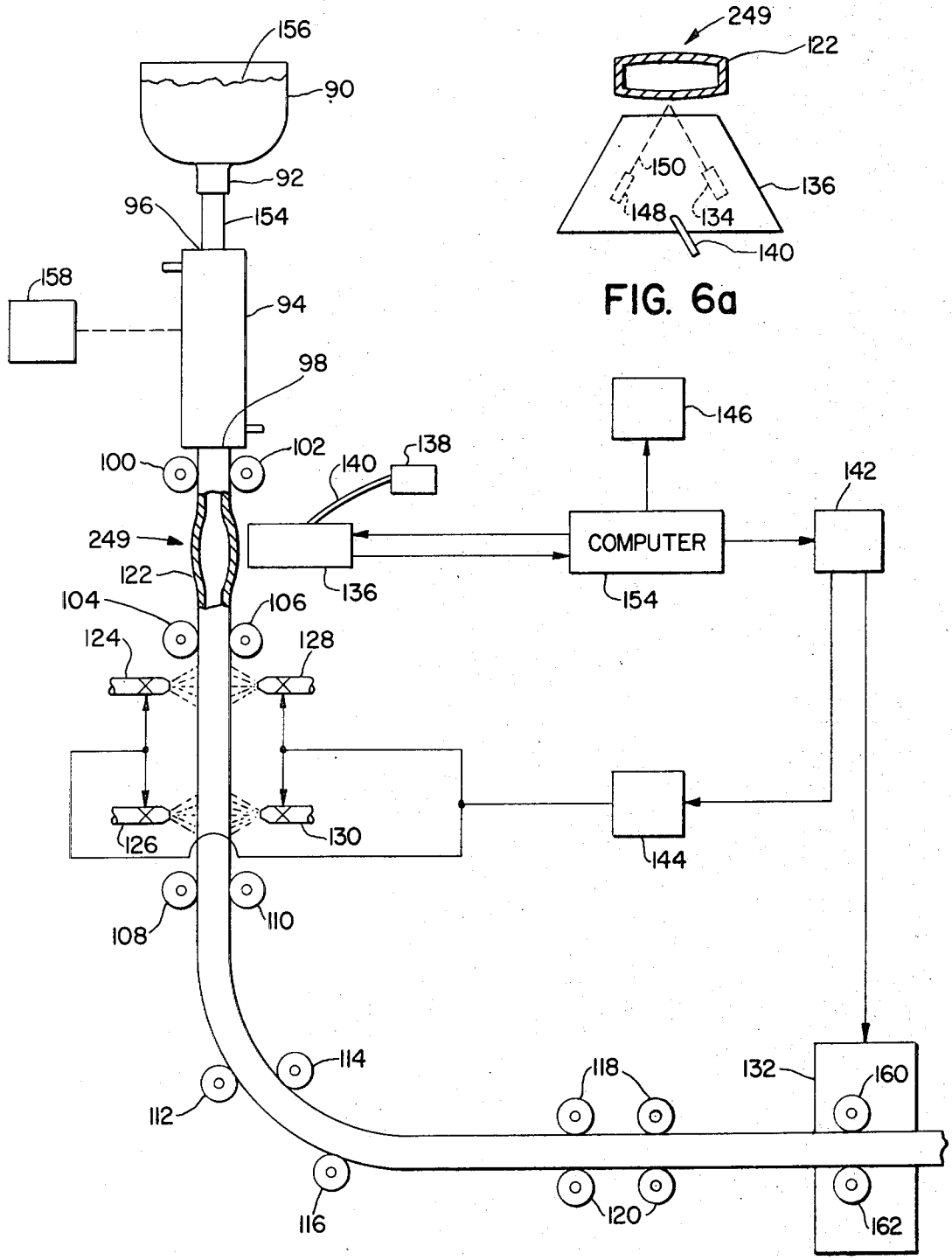
FIG. 6 is an illustration of a system embodying the present invention for controlling continuous casting of steel using solidified skin bulging information.
FIG. 6A is a top elevation showing certain portions of FIG. 6 in detail.

Referring now to FIG. 6, there is shown one type of system embodying the present invention for control of continuous casting of steel using solidified skin bulging information. Generally, the system comprises a tunduish 90 formed with a discharge spout 92; a mold 94 formed with opening 96 at one end and a discharge opening 98 at the other end, opening 96 being in register with spout 92; a plurality of rolls 100, 102, 104, 106, 110, 112, 114, 116 118 and 120 defining a curving path to carry a cast steel strand 122 from vertical to horizontal, rolls 100, 102, 104, 106, 108 and 110 being guide and support rolls, rolls 112, 114 and 116 being bending rolls and rolls 118 and 120 being straightening rolls; spray nozzles 124, 126 and 128, 130 disposed between rolls 104, 108 and 106, 110, respectively, and directed toward strand 122; a pinch rolls drive 132 operatively disposed about strand 122; optical conduit 136 in register with strand 122; a source 148 mounted to conduit 136 for generating a beam of coherent light 150 toward strand 122; a sensor 134 mounted to conduit 136 for detecting the illuminance of beam 150 as at the surface of strand 122; an air or nitrogen supply 138 operatively connected to conduit 136 via a duct 140; a computer 154 electrically connected to sensor 134 for determining the contour of strand 122 by triangulation; a control 142 electrically communicating with pinch rolls drive 132 and computer 154; a spray control 44 electrically connected to control 142 and each of the spray nozzles and a display 146 electrically connected to computer 154.

In operation, molten steel 156 as in tundish 90 is fed into mold 94 via discharge spout 92 and opening 96. Mold 94 is oscillated by a drive 158 operatively connected thereto so that steel 156 does not adhere therein. The surface contour of strand 22 is monitored continuously by sensor 134, i.e., laser beam 150 illuminates a spot on the surface of strand 122 and sensor 134 detects the relative movement of the illuminated spot. Angular position signals representing the sequence of operations of the laser transmitted beam and the sensor received beam are applied to computer 154 for calculation of the surface contour of strand 122. In order to maintain a steam free atmosphere in conduit 136 so that the optical path is unobscured, compressed air or nitrogen from supply 138 is blown through the conduits via duct 140. Contour signals as at the output of computer 154 are applied to display 146 for presentation and the signals as at output 154 are applied to control 142 for governing pinch roll drive 132 and control 144. Spray nozzle signals as at the output of control 142 are applied to control 144 for controlling spray nozzles 124, 126, 128, and 130 which emit water for controlling the temperature gradient along strand 122.

In addition to providing output signals to control 142 and display 146, computer 154 generates output signals for controlling the casting speed, i.e., the velocity at which strand 122 is advanced along the path (which is shown as being curved but which may be linear) by pinch rolls 160 and 162. As previously stated, the amount of bulge, as shown in FIG. at 249, is dependent on the ferrostatic pressure within the molten core, the thickness of the frozen skin, and the temperature gradient within the frozen skin. The optimum casting speed is computed on the basis of the measured bulging of the skin at 249 and the characteristics of the steel.

In an alternative embodiment, laser and receiver assemblies are provided on opposite sides of strand 122, for eliminating errors caused by motion of the rolls and mold.

Figure 7A:
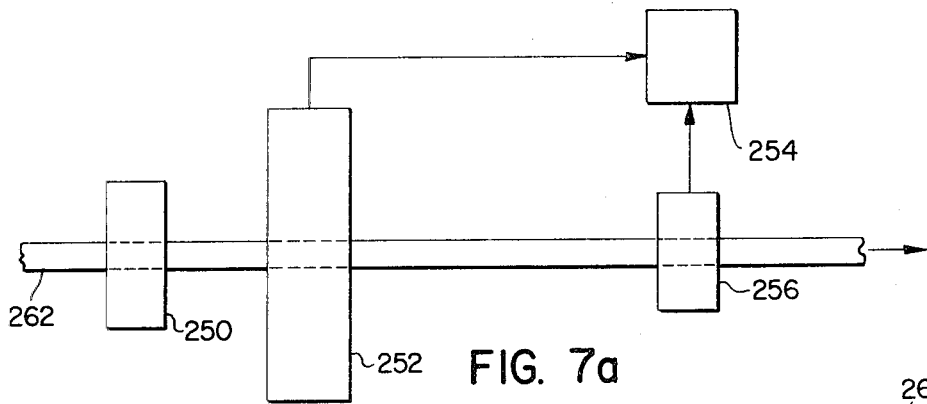
FIG. 7a–7c are a series of illustrations of a selective scarfing system embodying the present invention.
Figure 7B:
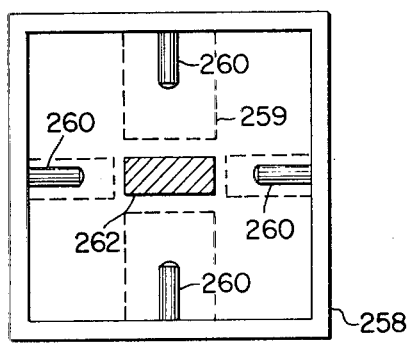
Figure 7C:
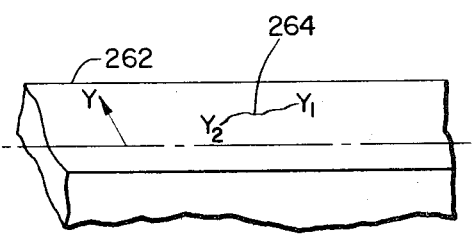

FIG. 7 is a schematic of a selective scarfing system embodying the present invention. The system is comprised of a descaling unit 250, surface inspection unit 252, process control computer 254, and multiburner scarfing unit 256. Descaling unit 250 is a high-pressure water stream optionally containing solid particles such as iron shot, sand, etc. Surface inspection unit 252 includes a rectangular frame 258 holding four detecting systems 260. Preferably, each of the detecting systems is of the type shown in FIG. 2 and is mounted in a conduit 259 having a steam free atmosphere. The spatial relationship between a slab 262 and each detector 260 is such that each detector 260 inspects one side of slab 262 by scanning in the direction normal to the motion of the slab. The scanning frequency is adjustable to accommodate different slab velocities. The measured coordinates of a defect 264 shown in FIG. 7c and the time interval $\Delta t$, of the passage of the defect under the scanning head are used by process control computer 254 to generate burner-on signals to multiburner 256. Although not shown, multiburner unit 256 includes a rectangular steel frame holding a number of gas burners, each burner having a separate control valve. The computer can be either an existing general purpose process control computer or a small specialized computing element. The surface defects information can be presented as a dynamic visual online display, recorded for statistical analysis, or fed online into a control system for feedback adjustment of chemical or physical parameters of the continuous casting process.

Since certain changes may be made in the foregoing disclosure without departing from the scope of the invention herein involved, it is intended that all matter contained in the above detailed description and depicted in the accompanying drawings be construed in an illustrative and not in a limiting sense.

What is claimed is:

1. A system for remote sensing of static, geometric and dynamic properties of a specimen being evaluated, said system comprising:
   a. a source for generating a coherent beam of electromagnetic radiation;
   b. scanning means operatively connected to said source;
   c. detector means for sensing the presence and position of said coherent beam as at the surface of said specimen;
   d. a computer communicating with said scanning means for providing scanning signals to said source, said beam incrementally scanning the surface of said specimen;
   e. means electrically connected to said computer for providing output signals representative of the angular position of said source; and
   f. means electrically connected to said computer for providing output signals representative of the angular position of said detector means.

2. The system as claimed in claim 1 including a display electrically connected to said computer for presentation of the properties of the specimen being evaluated.

3. The system as claimed in claim 2 including:
   a shaker for supporting said specimen, said shaker adapted for tri-axial movement; and
   b. a driver electrically interposed between said computer and said shaker, said driver being responsive to signals as at the output of said computer, said shaker being responsive to signals as at the output of said driver.

4. The system as claimed in claim 1 wherein said source is a laser.

5. The system as claimed in claim 1 wherein said detector includes an electro-optical detector for generating signals representative of the displacement of a point illuminance as at the surface of said specimen.

6. A system for continuous casting of metal comprising:
   a. a tundish formed with a discharge spout;
   b. a mold formed with an opening at one end and a discharge opening at the other end, said opening being in register with said spout;
   c. a strand formed by said mold and discharged through said opening;
   d. a plurality of guide rolls defining a curving path for carrying said strand;
   e. at least one pair of pinch rolls, said strand passing between said pinch rolls;
   f. a plurality of spray nozzles disposed about said strand for cooling said strand;
   g. laser means for generating a coherent beam of light toward said strand;
   h. a receiver for sensing said illuminance as at the surface of said strand;
   i. computer electrically connected to said receiver, the signals as at the output of said receiver representing angular positioning signals, the signals as at the output of said receiver being applied to said computer for calculation of the contour of said strand;
   j. supply means for providing compressed gas;
   k. conduit means operatively connected to said supply means, said conduit means in register with said strand and in register with said laser means and receiver, said compressed gas being blown from said supply means through said conduit means toward said strand;
   l. driving means operatively connected to said pinch rolls for pressing said pinch rolls against said strand; and
   m. a control electrically connected to said computer and driving means, the signals as at the output of said control being responsive to the signals as at the output of said computer, said driving means being responsive to the signals as at the output of said control, the speed of said strands being regulated by said pinch rolls.

7. The system as claimed in claim 6 including a display electrically connected to said computer for presenting a record of the surface contour of said strand.

8. A system for scarfing of metal comprising:
   a. means for descaling said metal;
   b. a source for generating a coherent beam of electromagnetic radiation;
   c. scanning means operatively connected to said source, said coherent beam scanning the surface of the metal;
   d. detector means for sensing defects in said metal;
   e. computing means communicating with said detector means and scanning means; and
   f. burner scarfing means communicating with said computing means, said burner scarfing means being responsive to signals as at the output of said computing means.

9. A system for remote sensing of static and dynamic properties of a specimen under evaluation, said system comprising:
   a source for generating a coherent beam of light;
   b. first means operatively connected to said source for directing said beam toward said specimen, said beam defining an illuminated spot as at the surface of said specimen, said first means generating output signals representing the angular position of said source;
   c. detector means for sensing said illuminated spot as at the surface of said specimen;
   d. second means operatively connected to said detector means for providing output signals representing the angular position of said detector means with respect to the illuminated spot as at the surface of said specimen; and
   e. computer means electrically communicating with said first and second means, said computer means generating scanning signals to said first source means, said beam incrementally scanning the surface of said specimen;
   f. the output signals of said first and second means being applied to said computer for triangulation, the distance between said source and detector being known, said computer generating signals representative of the properties of said specimen.

* * * * *